United States Patent [19]

Schimpfle

[11] 3,936,952

[45] Feb. 10, 1976

[54] APPARATUS FOR FREEZE-DRYING

[75] Inventor: Jorg Schimpfle, Rua Rio De Janeiro, Brazil

[73] Assignee: Krauss-Maffei Aktiengesellschaft, Munich, Germany

[22] Filed: Oct. 17, 1974

[21] Appl. No.: 515,559

[30] Foreign Application Priority Data

Oct. 17, 1973  Germany............................ 2352101

[52] U.S. Cl. .............................. 34/92; 34/5; 34/79
[51] Int. Cl.² .......................................... F26B 13/30
[58] Field of Search.............................. 34/5, 79, 92

[56] References Cited
UNITED STATES PATENTS

| | | | |
|---|---|---|---|
| 2,444,383 | 6/1948 | Stynler.............................. | 34/92 X |
| 2,448,272 | 8/1948 | Payne et al......................... | 34/92 X |
| 3,238,633 | 3/1966 | Hackenberg........................ | 34/79 X |
| 3,460,269 | 8/1969 | Kessler................................... | 34/92 |

Primary Examiner—John J. Camby
Attorney, Agent, or Firm—Karl F. Ross; Herbert Dubno

[57] ABSTRACT

A freeze-dryer, especially for comestibles such as coffee extract, is connected to a condenser with a dust separator interposed therebetween. The discharge opening of the dust separator communicates with an after-drying device with its own discharge arrangement for the freeze-dried dust. The vapor produced in the freeze-dryer is introduced into a passage connecting the main dryer with the dust separator.

10 Claims, 2 Drawing Figures

APPARATUS FOR FREEZE-DRYING

FIELD OF THE INVENTION

My present invention relates to an apparatus for freezedrying, and more particularly, to an apparatus for the freezedrying of comestibles such as coffee to form granular coffee extract.

BACKGROUND OF THE INVENTION

The freeze-drying process generally comprises subjecting a frozen product to heating at reduced (subatmospheric) pressure to sublimate water contained therein and thereby dry the product.

The apparatus for carrying out this process can comprise a sublimation-type dryer and a condenser connected thereto, a dust separator being interposed between the sublimating-type dryer and the condenser.

In a known arrangement of this kind, the dust recovered from the separator and containing residual moisture is fed back by a worm conveyor to a lower stage of the dryer and is mixed with the granular product therein. This has the disadvantage of altering the appearance of granulate.

For example, in the freeze-drying of coffee, the return of the moist dust to the granulate in the dryer tends to make the coffee extract somewhat yellowish and to decrease the market value of the product without appreciably effecting the taste.

Moreover, the return of moist dust to the granulate in the dryer detrimentally affects the bulk density of the product.

These problems have not been solved heretofore without loss of a valuable fraction of the product.

OBJECT OF THE INVENTION

It is the principal object of the present invention to provide an apparatus permitting economical recovery of the separated dust without interference with the quality of the product, thereby obviating the aforedescribed disadvantages.

SUMMARY OF THE INVENTION

It has now been found that it is possible, without loss of a valuable component of the product to be dried, to carry out freeze-drying with recovery of the dust, by collecting the dust in a separator between the dryer and the usual condenser, and subjecting the dust to an after-drying independently of the main dryer. It is indeed surprising, in light of the long-held belief heretofore that the dust could only be rendered useful upon return to granulate, that the dust has an independently valuable utility when subjected to after-drying apart from the granulate and is employed separately therefrom.

According to the principles of this invention, the outlet or discharge opening of the dust separator, in a system having a main sublimation-type dryer, a dust separator connected to the dust separator, is provided with an after-drying device with its own discharge arrangement for the dry dust.

This arrangement allows removal of the residual moisture from the product dust without deterioration of the quality of the granulate by contact with this dust and without alteration of the bulk density of the main product. The dry dust has been found to be a completely useful independent product of significance in the production of ₋nding machine or filter coffee and wherever rapid solubilization of the coffee is desired.

According to an important feature of the invention, a feed-back duct is provided for the return of the vapor produced in the after-drying device to a passage interconnecting the main dryer and the dust separator or into the dust separator directly. The vapor freed from the product dust thus eventually is led to the condenser connected to the dust separator and consequently an independent condensing arrangement for the after-dryer is unnecessary.

According to the invention, moreover, the after-dryer arrangement is a heated-worm conveyor having a housing of a cross-section increasing progressively in the direction of displacement of the dust by the worm, the vapor outlet opening into this housing at a location of minimal vapor turbulence. This approach ensures especially effective drying of the dust, minimum residual moisture and an effective separation of the dry dust from the vapor.

BRIEF DESCRIPTION OF THE DRAWING

The above and other objects features and advantages of the present invention will become more readily apparent from the following description, reference being made to the accompanying drawing in which.

SPECIFIC DESCRIPTION

Figure 1:
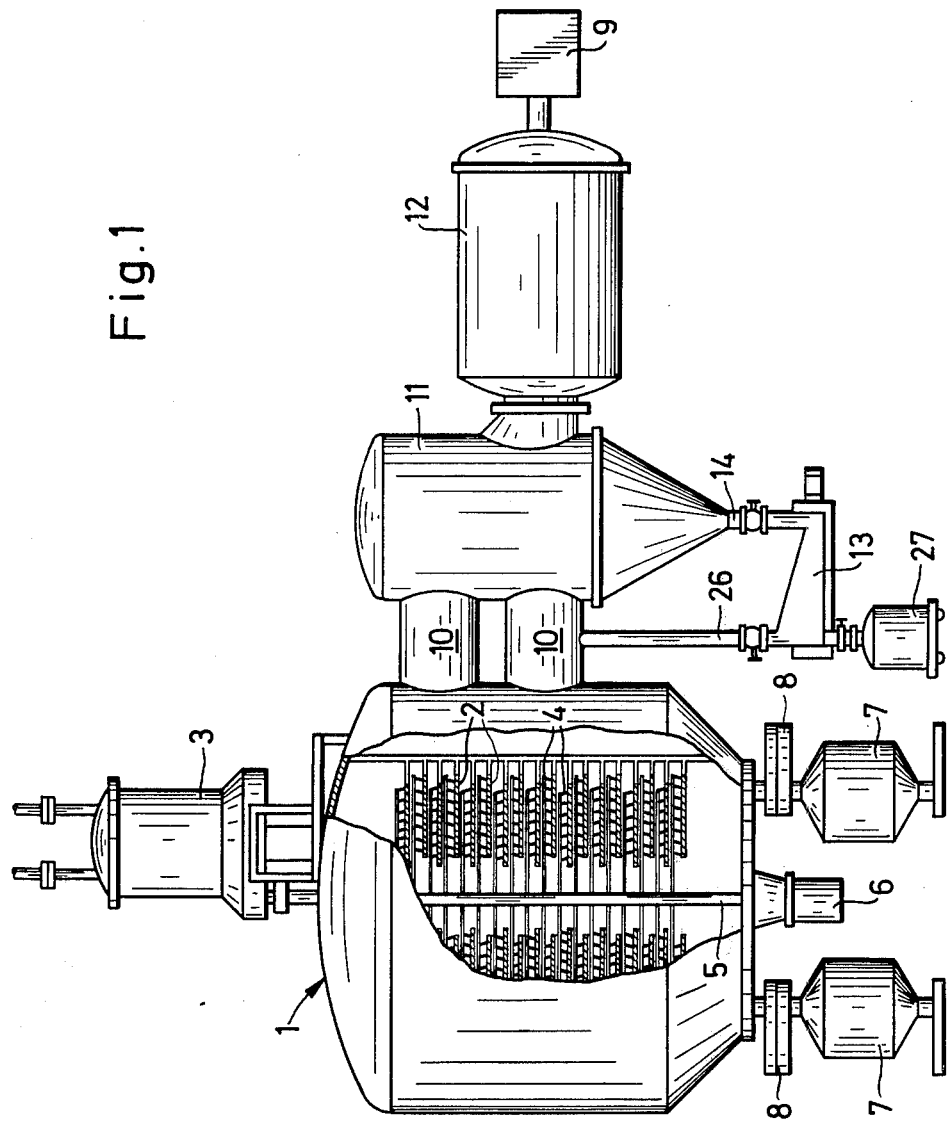
FIG. 1 is an elevational view partly broken away of an apparatus embodying the present invention.

In the drawing I show a sublimation-type plate dryer 1 of conventional construction and provided with a multiplicity of vertically spaced drying plates which can be heated by a fluid such as hot water. The plates 2 are in the form of annular discs.

Above the dryer 1 I provide an inlet gate 3 for the frozen product to be dried while scoops, vanes or the like can be provided at 4 on a vertical shaft 5 which may be rotated by the motor 6 to spread the product on the plates 2 and progressively cause the product to fall from the plate to plate through the dryer.

Discharge arrangements 7 are provided at the bottom of the dryer 1 and are formed with conventional vacuum gates 8 which permit the reduced pressure in the dryer to be maintained in spite of the fact that the product can be discharged. The discharge arrangements 7 empty the completely dried granulate into storage containers not shown.

Lateral passage or ducts 10 communicate with the side wall of the dryer 1 and open into a dust separator 11 of the cyclone type. The dust separator 11 has its free space above the conical discharge hopper of the separator connected with one or more condensers 12 which, in turn, are chilled by a refrigerating cycle not shown in detail. The condenser communicates with a suction source 9 which maintains the reduced pressure in the entire system which is necessary for freeze-drying. Of course, individual suction devices can be provided for each of the units 1, 11 and 12.

At the bottom of the dust separator 11 there is provided a discharge opening or outlet 14 which communicates with an afterdrying device 13 according to the present invention.

Figure 2:
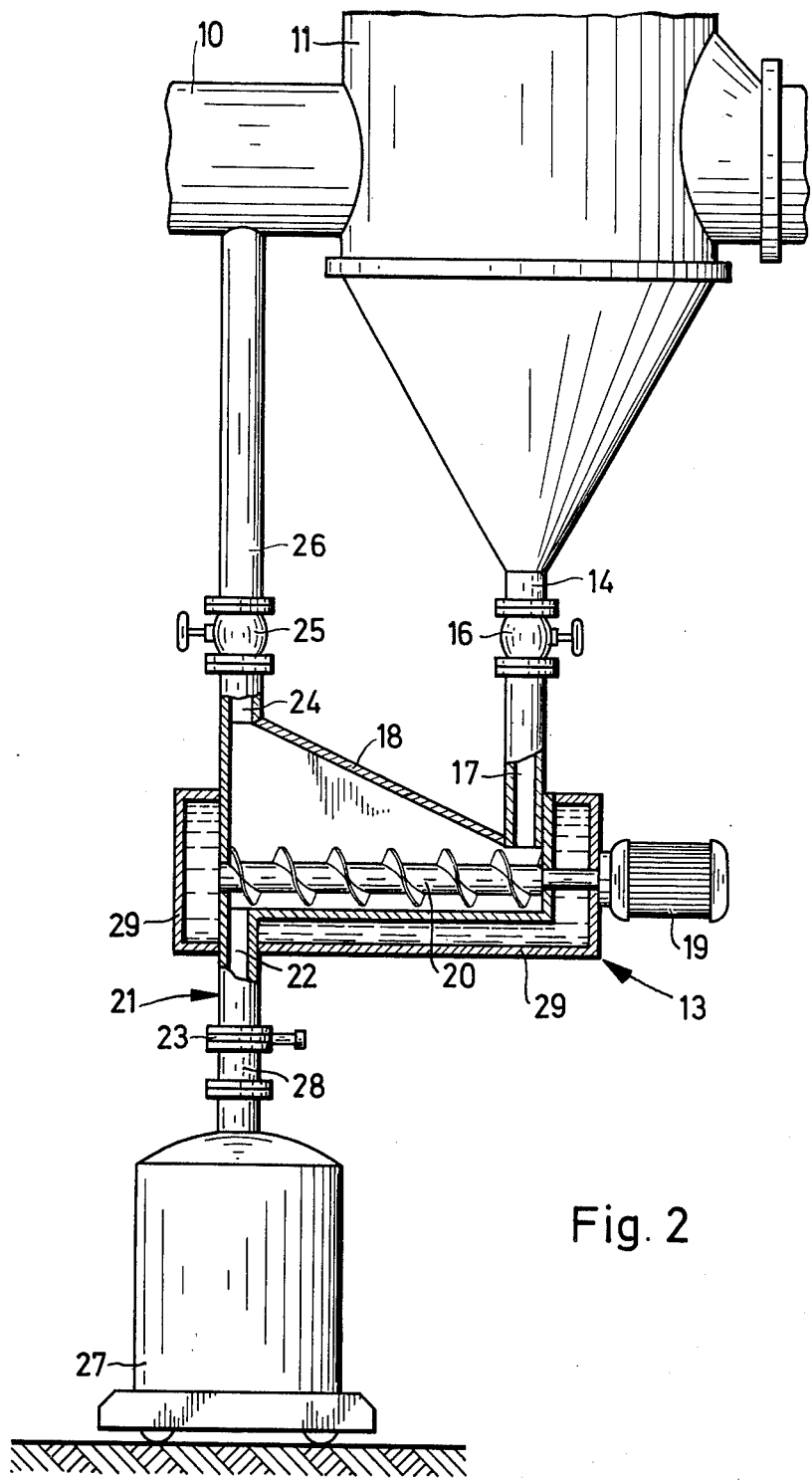
FIG. 2 is an enlarged detail view, partly in elevation and partly in section, of the after-drying device of the apparatus of FIG. 1.

The after-drying device 13 is shown in greater detail in FIG. 2 and is partly broken away in this FIGURE.

The discharge opening 14 of the dust separator 11 is connected via a ball valve 16 with a dust-conveying tube 17 which opens downwardly into the small-cross-section end of a housing 18 which widens horizontally away from the point at which the dustsupply tube 17 communicates with the housing.

A worm 20, driven by a motor 19 extends horizontally in the housing and is rotated so as to displace the dust from the narrow end of the housing to the wide end thereof. At the wide end of the housing there is provided a further discharge arrangement 21 which may be in the form of a simple vertical downwardly opening discharge pipe 22 connected through a vacuum gate 23, such as a tube-blocking duct, to a canister 27 in which the dust can be collected. A detachable fitting 28 couples the canister 27 with the duct 22.

As noted, the housing 18 widens in the direction of advance of the product by the worm 20 toward a discharge opening 24 and the upper part of the housing. This opening 24 is connected by a further ball valve 25 to a feedback line 26 which opens directly into the dryer 1 or into one of the ducts 10 communicating between the dryer 1 and the dust separator 11. The canister 27 can, of course, be replaced when filled by another.

The housing 18 is jacketed or otherwise formed with double walls on its sides and bottom to provide a heating chamber 29 which can be filled with hot water. Of course, other heating arrangements can be used, e.g. electric-heating wires, fluid-heated tube coils.

The product dust containing (coffee) residual moisture and collected in the dust separator 11 is led to the right-hand side of the worm or screw 20 and is thereby displaced across the heated zone formed by the housing 18. The vapor generated by the heating of the dust travels with reduced speed and turbulence through the housing and out through the duct 24 to the passage 10. Any dust entrained with this vapor is thus recycled to the dust separator. The after-dried product cascades through tube 21 and the discharge gate 23, 28 into the replaceable canister 27. The ball valves 16 and 25 and the vacuum slide 23 enable the required pressure differentials vis-a-vis the main freeze-drying apparatus to be established for operation in the manner described.

The product, finely subdivided and completely dried coffee powder, has been found to be especially effective for use as vending-machine coffee and filter coffee.

I claim:

1. An apparatus for the freeze-drying of a product comprising, in combination:
   a main dryer adapted to receive a frozen product and provided with means for heating said frozen product in vacuo to release vapor from said product and form a freeze-dried granulate therefrom;
   a dust separator communicating with said dryer for separating dust from the vapor emerging therefrom;
   a condenser connected to said dust separator for condensing the vapor upon separation of dust therefrom;
   an after-dryer connected to said dust separator for receiving separated dust therefrom and drying said separated dust independently of said granulate; and
   discharge means connected to said after-dryer and operable independently of the main dryer for discharging the dry dust from the apparatus as a product separate from said granulate.

2. The apparatus defined in claim 1 wherein said after-dryer comprises a housing in which vapor is generated upon the drying of said dust, said apparatus further comprising means communicating between said housing and said dryer for discharging vapor from said housing.

3. The apparatus defined in claim 2 wherein said separator is connected to said main dryer by at least one duct, said means communicating with said housing including a passage connecting said housing with said duct.

4. The apparatus defined in claim 2 wherein said after-dryer further comprises a worm rotatable in said housing for displacing dust therealong, and means for heating the dust in said housing.

5. The apparatus defined in claim 4 wherein said housing widens in the direction of advance of said dust by said worm, said means communicating with said housing opening therein at a wide portion of the housing.

6. The apparatus defined in claim 5, further comprising a replaceable canister communicating with said housing for receiving dry dust therefrom.

7. The apparatus defined in claim 6, further comprising a suction source connected to said apparatus at said condenser.

8. The apparatus defined in claim 7 wherein said housing is double-walled and is provided with a heating fluid.

9. The apparatus defined in claim 8, further comprising a ball valve between said separator and said housing.

10. The apparatus defined in claim 9, further comprising another ball valve in said means communicating with said housing.

* * * * *